Sept. 16, 1969  J. F. SCHIRTZINGER  3,466,680
APPARATUS FOR LOADING AND UNLOADING OFFSHORE VESSELS
Filed July 14, 1967  3 Sheets-Sheet 1
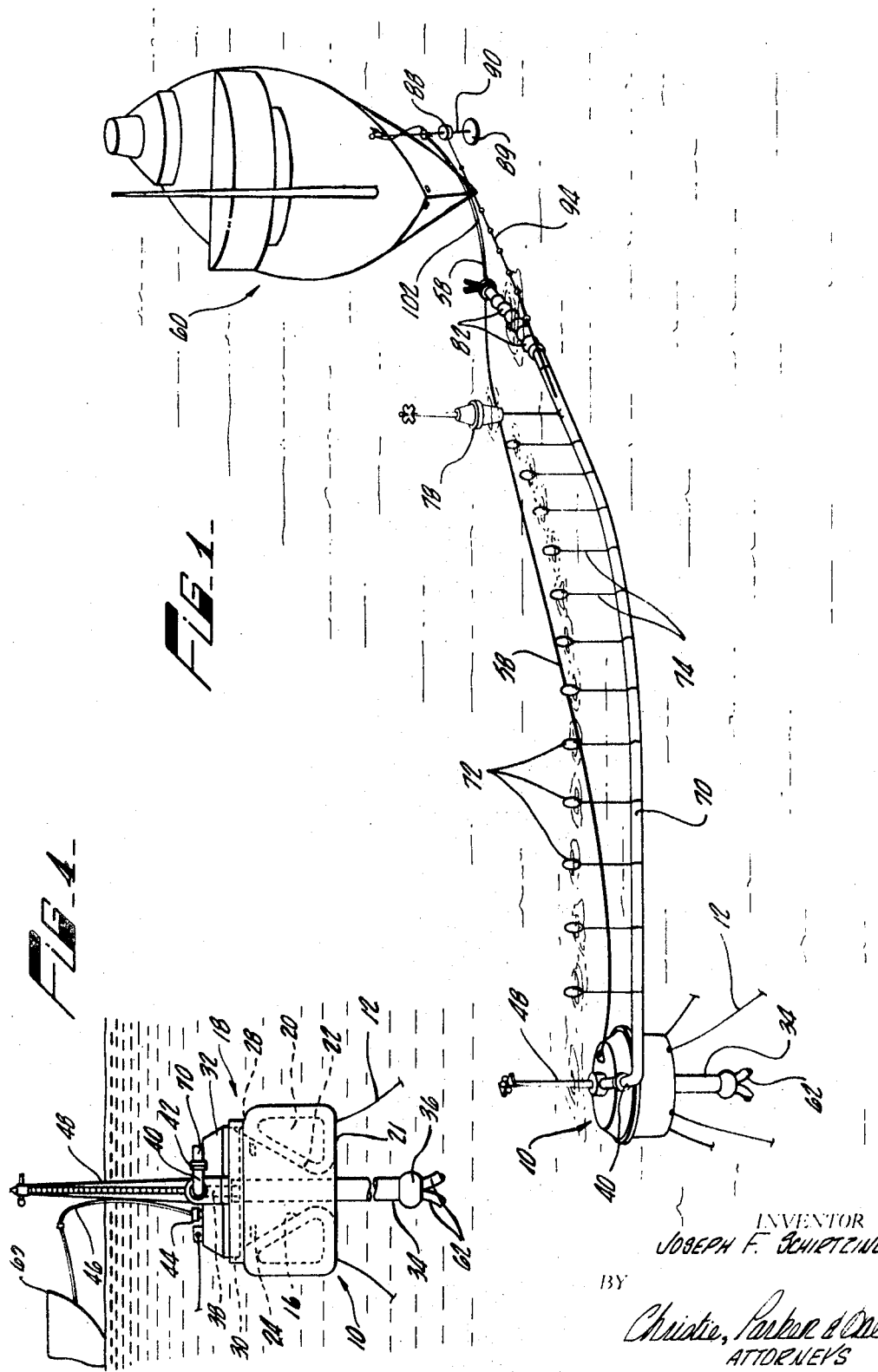
INVENTOR
JOSEPH F. SCHIRTZINGER
BY
Christie, Parker & Hale
ATTORNEYS

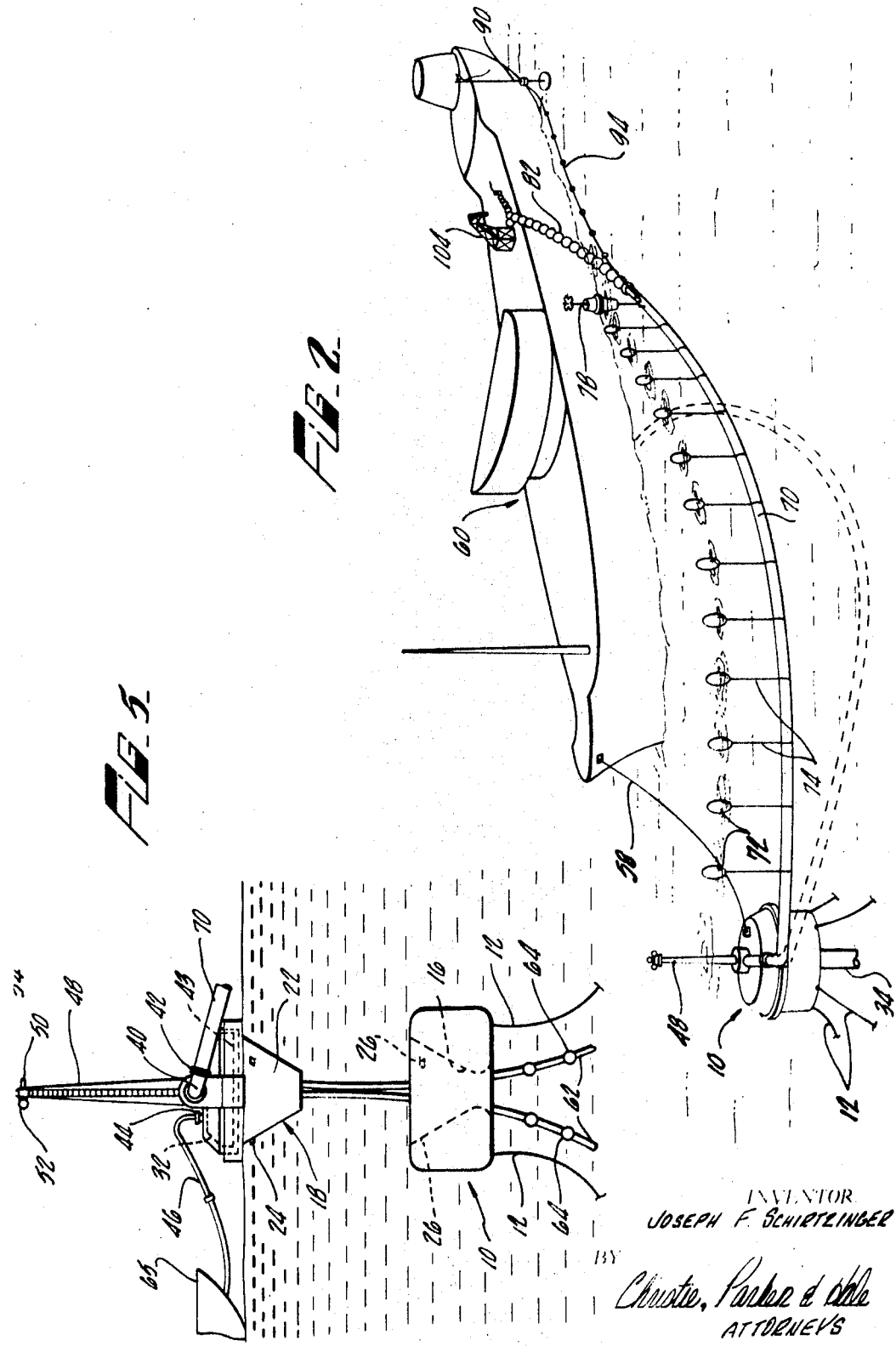

Sept. 16, 1969   J. F. SCHIRTZINGER   3,466,680
APPARATUS FOR LOADING AND UNLOADING OFFSHORE VESSELS
Filed July 14, 1967   3 Sheets-Sheet 3
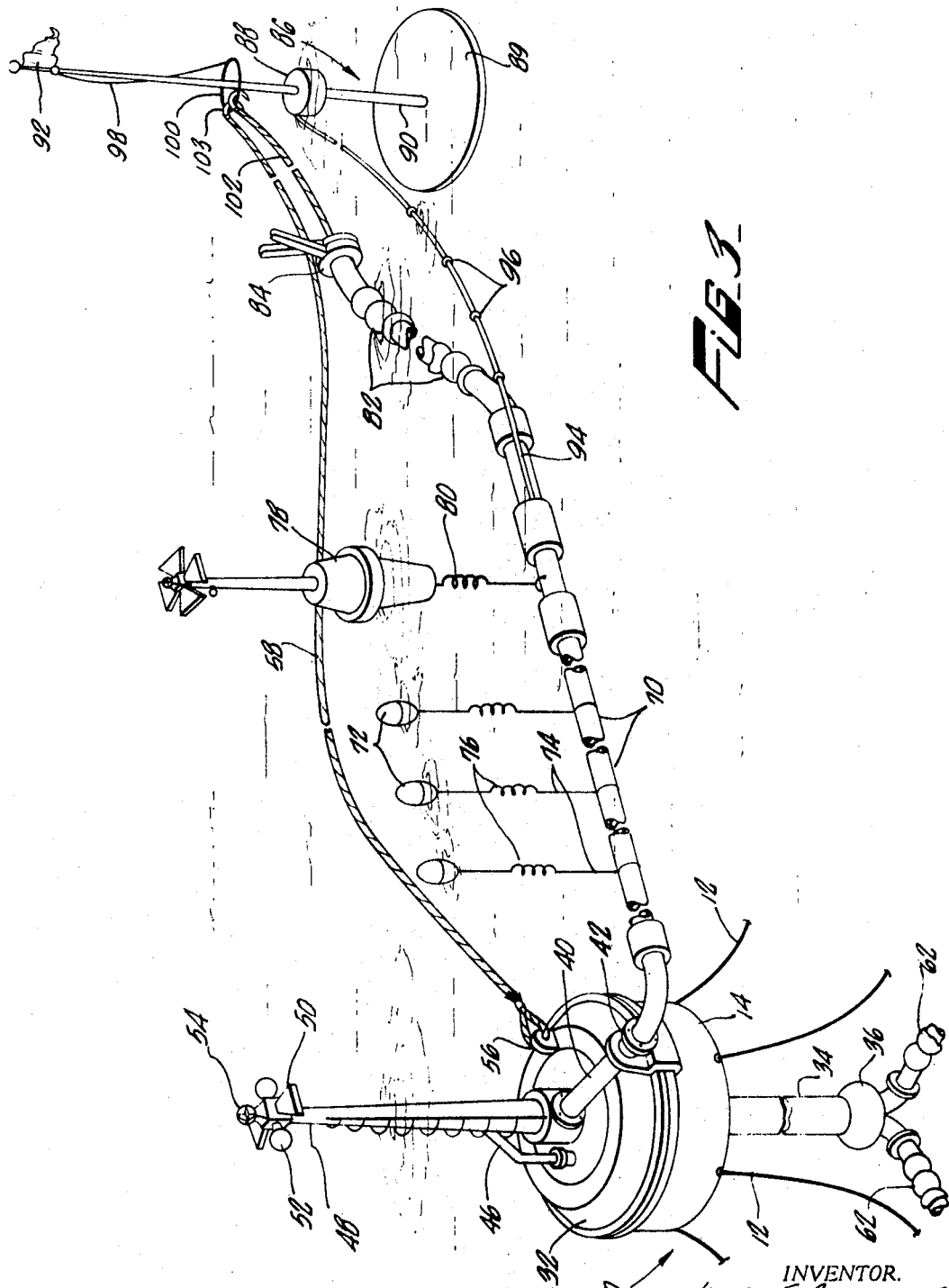
INVENTOR.
JOSEPH F. SCHIRTZINGER
BY
*Christie, Parker & Hale*
ATTORNEYS

United States Patent Office 3,466,680
Patented Sept. 16, 1969

3,466,680
APPARATUS FOR LOADING AND UNLOADING OFFSHORE VESSELS
Joseph F. Schirtzinger, Pasadena, Calif., assignor to Air Logistics Corporation, Pasadena, Calif., a corporation of California
Filed July 14, 1967, Ser. No. 653,358
Int.Cl. B63b 21/52, 51/02
U.S. Cl. 9—8        12 Claims

ABSTRACT OF THE DISCLOSURE

Offshore loading and unloading apparatus having a completely submerged buoy constrained to the floor underlying a body of water and a submerged pipe horizontally extending away from the buoy which can be connected to a vessel. Means for transporting material between the buoy and the shore are secured to the buoy whereby material can be transported between the vessel and the shore. The buoy is adapted to moor a vessel which loads or unloads at the buoy.

BACKGROUND OF THE INVENTION

This information relates to apparatus for loading and unloading vessels, and more particularly for loading and unloading fluids from a vessel which is located offshore.

In the transfer of materials, and more particularly of fluids, between ports by means of vessels, a loading and unloading operation is required at either terminal. With respect to vessels carrying fluids, several methods have in the past been used to accomplish the transfer between the shore and the vessel.

Most commonly, the vessels are docked at a shoreside docking facility and the material is transferred between the vessel and shore installations by connecting a flexible hose or tube to the vessel. This method of transferring the cargo is relatively expensive because it requires expensive docking facilities as well as means, such as tugboats, for guiding the vessel to the dock. Generally large vessels, such as oceangoing vessels, are incapable of docking under their own power due to the relatively shallow water in the vicinity of the dock. Aside from economical considerations, poor weather, such as stormy weather conditions, high waves, currents, or tides, often make it impossible for a vessel to dock for extended periods of time. During a storm, a vessel might have to remain outside the dock or, if already docked, may have to remain at the dock until the storm subsides. During such times the vessel as well as the dock are unused and cause economic waste.

Similar considerations apply to anchored or ground-attached offshore moorings and transfer facilities to which the vessel is moored. Such facilities employ submarine pipelines from the shore to the docking point and flexible tubes that are attached to the vessel for transferring the cargo. Although vessels are able to dock at this facilities without the help of tugboats as long as favorable weather conditions prevail, heavy seas or high winds frequently make it impossible to dock. In addition, should heavy seas occur while the vessel is moored, the docking facilities might become damaged.

More recently, vessels have been anchored by means of a bow and a stern anchor and adjacent a submarine pipeline which had attached thereto a flexible hose to transfer the fluid from the vessel to the shore. This system required the assistance of a tugboat or a launch in order to bring the flexible hose secured to the submarine pipeline to the vessel. Heavy winds and waves make this system unusable since it is then almost impossible for the tug to approach the vessel with the flexible hose. In addition, the wind and the waves often move the vessel to such an extent that it breaks loose from the hose, thereby damaging the installation which requires expensive repair work.

To avoid some of the shortcomings encountered by anchoring the ship independently from the pipeline and the transfer hose, floating buoys were utilized to which the vessel could be moored. These buoys are a junction point between a submarine pipeline leading from the shore to the buoy and a hose leading from the buoy to the vessel. This greatly enhanced the utility of offshore loading and unloading since both the vessel and the hose running from the vessel to the buoy are secured to a common point, namely the buoy. A number of problems nevertheless prevented full utilization of this relatively inexpensive method for loading and unloading of vessels.

The buoy as well as the flexible hose leading from the buoy are frequently damaged by vessels running over them. Although the buoy can be marked to make it visible, poor weather conditions still subject it to damage from vessels coming in contact with it. The hoses running from the buoy to the vessel, on the other hand, are invisible from a ship and are invariably cut when a ship passes over them.

Moreover, even under calm weather conditions there is a danger that light waves move the vessel toward the buoy to which it is anchored. Mooring lines do not prevent this problem. There is therefore a danger of accidental damage to the buoy from light waves which push the vessel toward the buoy.

Since the hose between the buoy and the ship has to be relatively long, because the vessel has to be moored some distance from the buoy and because the hose has to have sufficient length to enable it to be connected to the ship at the point furthest removed from the buoy, it is frequently difficult for an approaching vessel to locate the end of the hose. Wave and wind action tended to float the hose over large areas, sometimes extending to as much as a mile in diameter. It is difficult and sometimes almost impossible for large vessels to retrieve the hose without the help of a launch or a tug. Attempts have been made to rectify this problem by utilizing portions of rigid pipe that extended away from the buoy and had secured to their ends relatively short portions of flexible hose. Although this aided in locating and retrieving the hose, the rigid pipe was frequently crushed or kinked when the vessel moved relative the buoy under the action of winds or waves.

SUMMARY OF THE INVENTION

This invention provides apparatus for loading or unloading fluids such as crude and refined petroleum products, liquid or granular chemicals, fresh water, or flowing solids such as grains, while the vessel is moored offshore. Briefly, the apparatus includes a first buoy constrained to be submerged and including a chamber, a first tubular means secured at one end to the buoy in flow communication with the chamber and extending away from the buoy beneath the water surface. A second tubular means is secured to the buoy in flow communication with the chamber for transporting fluid from the buoy to the shore. Flexible tubular means are connected to the other end of the first tubular means. A second buoy includes a mast portion extending above the water surface and is attached to the free end of the first tubular means by connecting means having one end disposed on the mast portion and the other end affixed to the first tubular means. Flexible hoisting means have one end affixed to the flexible tubular means and another end movably disposed on the mast portion for hoisting the flexible tubular means aboard the vessel.

This apparatus enables the vessel to load or unload its cargo even under severest weather conditions since it can pull up to the buoy without the danger of damaging either the buoy, the pipe, or any other facility. The apparatus is constructed such that the flexible hose attached to the end of the pipe can be picked up from aboard the vessel without requiring the assistance of tugs or a launch. The semirigid pipe is adjacent a floating marker such that it is easily located by an approaching vessel. The pipe is sufficiently flexible to absorb relative movements between the vessel and the buoy without being crushed or kinked. In addition, the pipe has a tendency to maintain a straight position, thereby imparting a force onto the vessel which biases the vessel away from the first buoy. This force is sufficient to prevent collisions between the vessel and the buoy in calm weather when light wave action might otherwise push the vessel toward the buoy.

In its preferred embodiment the vessel is moored to the buoy, and the mooring line as well as the semirigid pipe extending toward the vessel are rotatable on a vertical axis such that both the vessel and the pipe can move relative to the buoy without damaging the buoy or the pipe connections. Furthermore, the buoy is preferably provided with locating devices that permit the vessel to find the buoy and the unloading apparatus irrespective of weather conditions or darkness.

The apparatus of this invention permits a vessel to tie up rapidly adjacent the buoy, to load or unload as required and to depart under almost any weather condition. In the past, weather conditions frequently prohibited the docking, loading or unloading of vessels.

BRIEF DESCRIPTION OF THE DRAWINGS

FIG. 1 is a perspective view of a vessel approaching a submerged buoy for subsequent loading or unloading operations;

FIG. 2 is a perspective view of a vessel moored to the buoy while loading or unloading, with the pipe connected to the vessel and with the pipe shown connected to another portion of the vessel in phantom lines;

FIG. 3 is an enlarged perspective view of an apparatus for loading or unloading a vessel constructed according to this invention;

FIG. 4 is an elevational view of a buoy constructed according to this invention; and FIG. 5 is an elevational view of a buoy showing part of the buoy raised to the surface of the water.

DESCRIPTION OF THE PREFERRED EMBODIMENTS

Referring initially to FIGS. 3, 4 and 5, a completely submerged first buoy 10 is shown disposed in a body of water and constrained to a floor beneath the body of water by anchor chains 12. The anchor chains are secured to the floor or connected to anchors (not shown) that rest on the floor. The buoy comprises a lower portion 14 secured to anchor chains 12 and which is preferably of a cylindrical shape. The lower portion is provided with an upwardly opening conical aperture 16 centered in the lower portion and which receives a conically shaped upper portion 18. An annular chamber 20 defined by the circumference of the lower portion, its end walls 21, and the wall defining the conical aperture, is filed with air or with some other suitable buoyant material such as plastic foam to provide the lower portion with a buoyancy sufficient to hold it tightly against the anchor chains 12.

The upper portion of the buoy includes a conical insert 22 provided with a plurality of outwardly extending dogs or latches 24. The latches are selectively retractable and engage mating undercuts 26 in the conical aperture 16 of the lower portion of the buoy. Springs (not shown) bias the latches in an outward direction and suitable means (not shown), such as a hydraulic cylinder, is actuated to retract the latches against the force of the springs to disengage insert 22 from the lower portion 14 of the buoy. The upper end of the conical insert includes a cylindrical cutout 28 and receives a cylindrical portion 30 of a cover 32.

The cover is suitably restrained to the cylindrical cutout in insert 22 and is rotatable relative to the insert and the lower portion of the buoy on a vertical axis. A guide sleeve 34 is secured to the insert 22 and extends downwardly from the insert beyond the lower portion 14. The lower end of the guide sleeve includes an enlarged doughnut-shaped bushing 36 with a diameter greater than the smallest diameter of of the conical aperture 16 such that it acts as a stop when the guide sleeve is moved in an upward direction relative to the lower portion of the buoy. The guide sleeve extends upwardly into the space defined by the cylindrical cutout 28 of insert 22 and slidably receives a vertically disposed pipe 38 secured to cover 32. The opposing surfaces of the vertical pipe and the guide sleeves are suitably sealed, such as by resilient rubber O-ring (not shown), relative to each other to form a rotatable and fluid-tight seal between them. Alternatively, standard rotatable seals available on the market may be used to seal the sleeve and the pipe. The other end of pipe 38 is secured to cover 32 and leads into a horizontally extending pipe 40 which terminates in a pape flange 42. Pipe 38 thereby defines a chamber which fluidly communicates pipe 40 with the upper portion of guide sleeve 34.

Cover 32 defines an enclosed cylindrical chamber 43 with the vertical pipe 38 being disposed in the center of the chamber which is selectively filled with water or air through a pipe fitting 44 located at the upper surface of the cover. The chamber is dimensioned such that by filling it with water the upper portion of the buoy, which includes the cover and the conical insert 22, has a negative buoyancy and sinks when not supported otherwise. If the space is filled with air, which is done by connecting hose 46 with a supply of pressurized air and blowing the water contained in the chamber 43 out through a suitable check valve (not shown), the upper portion of the buoy is given a positive buoyancy and rises to the surface of the water when the latches 24 are disengaged from the undercuts 26. By only partially filling the space with water, the upper portion is given a neutral buoyancy. To properly balance the buoyancy of the upper portion 18, the conical insert 22 can be filled with a buoyant material such as plastic foam (not shown).

A marker mast 48 is secured to the upper surface of cover 32 and extends upwardly above the waterline. Secured to the mast are suitable signaling devices, such as a foghorn 50, positioning lights 52, radar corner reflectors 54 and similar devices. Hose 46 connected with pipe fitting 44 in the cover, a pressure hose (not shown) leading to the means for retracting latches 24 and a signaling tube (not shown) used for detecting leaks in a rotatable joint between the vertical pipe 38 and the sleeve 34 are also secured to the mast and extend upwardly beyond the waterline.

Secured to the cover 32 is a bracket 56 provided with a hole for receiving a mooring line 58 to moor a vessel 60 to the buoy 10.

Secured to the lower end of guide sleeve 34 are flexible hoses 62 that connect the guide sleeves, the vertical pipe 38 and the horizontal pipe 40 with a submarine pipeline (not shown) leading to shore installations (not shown) for receiving and delivering fluids to be loaded on or unloaded from the vessel.

If the buoy 10 is located in shallow waters, such that guide sleeve 34 comes close to or contacts the ocean floor before the conical insert 22 is nested in aperture 16 of the lower portion of the buoy, the guide sleeve is omitted. The flexible hose 62 from the submarine pipeline then extends directly into a tube (not shown) which is similar to the portion of the guide sleeves extending into the upper portion of the buoy, and which tube is also rotatably connected to the vertical pipe 38. Since the lower portion of the buoy is relatively close to the ocean floor and there is substantially more length of flexible hose which will rest on the ocean floor when the upper portion of the buoy is submerged, the hose is provided with annular protectors 64 to minimize abrasion between the flexible hose and the ocean floor.

The upper portion 18 of the buoy 10 is normally secured to the lower portion 14 by means of the latches 24 extending outwardly and into the undercuts 26 in the conical aperture 16. The distance between the waterline and the upper surface of cover 32 is sufficient to avoid collision between vessels using the apparatus and the buoy. When installed for use in conjunction with oceangoing vessels, this distance is from about 30 to about 40 feet. The mast 48 extends above the waterline, and the signaling devices indicate to approaching vessels the location of the submerged buoy.

If the buoy is to be inspected or repaired, as when there is a leak in the rotatable joint between guide sleeve 34 and the vertical pipe 38, hose 46 extending above the waterline is connected to pressurized air of a service vessel 65 and air is blown into chamber 43 interiorly of cover 32 to evacuate water contained therein. Simultaneously, the means for retracting the latches 24 are actuated to disengage the upper from the lower portion of the buoy. After a sufficient amount of water has been evacuated, the upper portion of the buoy together with the sleeve 34 and the mast 48 raises until the cover 32 is above the waterline. At this point bushing 36 secured to the lower end of the guide sleeve engages the conical aperture 16 and restrains the upper portion of the buoy to the lower portion and guide sleeve 34 keeps the two aligned. After the inspection or repair have taken place, the upper portion 18 is lowered by filling chamber 43 of the cover with a sufficient amount of water to give the upper portion a negative buoyancy. Guided by the guide sleeve 34, the upper portion then submerges until it is in contact with the lower portion. The spring-loaded latches then engage the undercuts 26 and secure the two portions of the buoy to each other.

Referring now to FIG. 3, an elongated pipe 70 is shown attached to flange 42 on the cover of the buoy. The pipe is floatingly supported in an approximately horizontal plane and at a submerged depth about equal to the submerged depth of cover 32 by a plurality of floats 72 secured to the pipe by suitable means, such as cables 74. Since the floats rise and lower with the wave action, and since this might transmit forces to the pipe that are unevenly distributed over the length of the pipe which may cause it to become overstressed, tension springs 76 are preferably disposed intermediate the floats and the pipe. The tension springs absorb a substantial part of the vertical movement of the floats to reduce the forces transmitted to the pipe. They substantially reduce or eliminate the danger of overstressing the pipe from the heaving motion of the floats.

A cargo pipe or third buoy 78 is secured to the free end of pipe 70 by means of a cable 80 and is provided with signaling devices similar to the signaling devices secured to mast 48 of the buoy 10. A vessel approaching the apparatus is thus capable of locating the position of the end of the cargo pipe 70.

To increase the flexibility of pipe 70, which is needed to prevent breakage from the vertical movement of the floats 72 under wave action and during the loading and unloading operations, the pipe is preferably made of a relatively flexible material. One such material is marketed under the name of "Stratoglas" and comprises fiber glass filaments bonded together with an epoxy resin to provide a reinforced, laminated plastic. This material possesses an unusual combination of structural strength, impact resistance and flexural characteristics. If the pipe is constructed of "Stratoglas" or of a material having similar characteristics, it can be repeatedly deformed, as shown in phantom lines in FIG. 2 for example, without damage to the pipe and while deformed, the pipe has a tendency to assume a straight position. Any objects secured to the free end of the pipe, such as the vessel 60, are thereby biased away from the buoy.

Secured to the free end of the pipe 70 is a flexible member or hose 82 which is of sufficient length to bring it aboard the vessel 60 for connecting the pipe with the vessel's unloading facilities (not shown). The flexible hose includes a cover 84 at its open end to prevent water from entering the hose and the pipe.

A tilting or second buoy 86, comprising a free floating buoy 88, a submerged contact disc 89 having a relatively large diameter such that the hull of a vessel, particularly the relatively straight sidewalls of oceangoing tankers, can engage the periphery of the disc, and an upright mast 90, is positioned some distance from the end of flexible hose 82. The upright mast is attached to buoy 88 and can be tilted in any desired direction. The mast is sufficiently long such that it extends to above the level of the deck of vessel 60 and is further provided with signaling means such as a flag 92, lights, horns, etc. to enable an approaching vessel to locate it. A semiflexible rod 94, preferably constructed of "Stratoglas" and provided with a plurality of floats 96 which keep the rod on the surface of the water, is secured to the free end of pipe 70 and to the buoy 88. One end of a messenger line 98 is secured to a ring 100 which is disposed around the upright mast 90. The ring is slidable in a vertical direction along the mast. The other end of the messenger line is secured to the upper end of mast 90. A person can thereby grasp the messenger line and pull it toward him to move the ring in an upward direction. The end of mooring line 58 as well as a pickup line 102, one end of which is affixed to the flexible loading hose 82, is suitably secured to the ring such as by hooks 103.

A vessel 60 approaches the apparatus as shown in FIG. 1. Floating forwardly it approaches the space between the cargo tube buoy 78 and the upright mast 90 while turning slightly to starboard. The bow of the ship thereby engages the flexible rod 94 whereby the buoy 86 is pulled toward the vessel until the hull of the vessel engages the contact disc 89. This engagement tilts the buoy sideways toward the vessel. As the vessel continues this movement, its hull contacts the upright mast and slidably passes along the mast. A crew member standing aboard the ship grasps the messenger line 98 fastened to the upright mast and pulls the ring, together with the mooring line 58 and the pickup line 102, in an upward direction until it is at approximately the level of the ship's deck. The two lines are then disconnected from the ring and dragged aboard the ship. The mooring line is carried toward the bow of the ship and is suitably secured to a capstan (not shown) for mooring the ship to buoy 10. Simultaneously, mast 90 of buoy 86 is tied up to the vessel to prevent it from floating away from the vessel.

The pickup line 102 is connected to suitable means, such as a crane 104 aboard the vessel, to hoist the flexible hose 82 aboard the ship. To prevent stresses in and possible fracture of the flexible hose from relative movements between the ship and the pipe 70, the cargo pipe buoy 78 is suitably tied up alongside the vessel as shown in FIG. 2. After the cargo pipe buoy has been tied up and the flexible hose connected to pumping means (not shown) on the ship, the loading or unloading operation commences. The pumps aboard the ship pump the fluid into the flexible hose 82, thence through pipe 70, the horizontal pipe 40, the vertical pipe 38, guide sleeve 34, flexible hoses 62, and into the submerged pipeline (not shown) leading to a shore.

If current or wind conditions cause the ship to drift relative to buoy 10, no stresses are transmitted to pipe 70. The vessel is restrained to buoy 10 and any movement of the vessel is accompanied by a like movement of the pipe 70 since both are restrained to the rotatable cover 32 of the buoy. Thus, any movements by the vessel are duplicated by the pipe and the two remain fixed relative to each other.

As is frequently the case when the vessel is a large oceangoing tanker, the fluid has to be pumped from the vessel aft and forward of the bridge. If the aft section of the vessel has been unloaded first, the flexible hose has to be moved toward the forward section of the vessel as shown in phantom lines in FIG. 2. This is done by disconnecting the hose from the pumping equipment, running out additional length of mooring line 58, and moving the vessel relative to the pipe 70 until the pipe is at the position forward of the bridge of the vessel. Alternatively, the pipe can be brought forward without moving the vessel by pulling the cargo pipe buoy 78 alongside the vessel, thereby temporarily deforming the pipe as shown in phantom lines in FIG. 2. The flexible hose 82 is then reconnected to the pumping equipment to continue the loading or unloading of the vessel. If the pipe is constructed of a relatively flexible material, such as "Stratoglas," the deformation does not crush or kink it as was the case in the past when such pipes were bent to the extent shown in FIG. 2.

After the loading or unloading operation is terminated, the flexible hose 82 is disconnected from the pumping equipment aboard the vessel and the cover 84 is secured to the open end of the hose. Thereafter, the hose is thrown overboard and the pickup line 102 is connected to ring 100 on the upright mast 90. The mooring line 58 is disengaged from the capstan on the vessel, thrown overboard, and its end is similarly attached to ring 100. The vessel is now free to leave the loading or unloading facilities under its own power and irrespective of weather conditions. Since all facilities are submerged at a safe depth, injury to them from coming in contact with the departing vessel is impossible.

While the pipe 70 is so tied to the vessel it has a tendency to assume a straight position. The deformed pipe acts as a spring and biases the vessel away from the buoy 10. Similarly, when the pipe is secured to the vessel in a straight position and light waves, as frequently encountered in calm weather, push the vessel toward the buoy, the biasing force from the pipe acts in opposition thereto. The heretofore common collisions between a vessel and a buoy during calm weather are thereby substantially reduced. During stormy weather this danger does not exist since the vessel ties up downwind of the buoy and the heavy winds maintain the vessel in that position.

I claim:

1. Apparatus for loading and unloading vessels in offshore waters, the apparatus comprising a first buoy constrained to be submerged and including a chamber, a first tubular means secured at one end to the buoy in flow communication with the chamber and extending away from the buoy beneath the water surface, a second tubular means secured to the buoy in flow communication with the chamber for transporting fluid from the buoy to the shore, flexible tubular means connected to the other end of the first tubular means, a second buoy including a mast portion extending above the water surface, connecting means having one end disposed on the mast portion and the other end affixed to the first tubular means, and flexible hoisting means having one end affixed to the flexible tubular means and another end movably disposed on the mast portion for hoisting the flexible tubular means aboard the vessel.

2. Apparatus according to claim 1 including means for mooring a vessel to the first buoy, one end of said means being movably disposed on the mast portion of the second buoy.

3. Apparatus according to claim 2 wherein the first tubular means and the means for mooring the vessel are rotatable relative to at least a portion of the first buoy on a substantially vertical axis of the buoy.

4. Apparatus according to claim 1 including a float secured to the first tubular means and means disposed intermediate the float and the first tubular means for varying the distance between the float and the tubular means in response to wave action.

5. Apparatus according to claim 4 including means for indicating the position of the first buoy.

6. Apparatus according to claim 4 including a third buoy secured to the first tubular means adjacent the end connected with the flexible tubular means.

7. Apparatus according to claim 6 wherein the hoisting means are connected with a messenger line having one end secured to the mast portion adjacent an upper end of the mast portion.

8. Apparatus according to claim 1 including a submerged contact disc secured to the second buoy.

9. A buoy for mooring a vessel in a body of water and for transmitting fluids transported between the vessel and a shore of the body of water, the buoy comprising a buoyant lower portion, means for constraining the lower portion to float beneath the body of water, an upper portion vertically movable relative to the lower portion and including a cover rotatable on a vertical axis, said upper portion defining a chamber and including means for selectively filling the chamber with water and air, means for mooring a vessel to the buoy, means for connecting a pipe extending away from the buoy with the cover, and means for connecting the pipe with means for transporting fluids from the buoy to the shore.

10. Apparatus for loading and unloading vessels in offshore waters, the apparatus comprising a first buoy, means for holding the first buoy in a completely submerged position, means for mooring the vessel to the first buoy, a submerged pipe rotatable relative to said buoy on a substantially vertical axis and secured at one end to the buoy, flexible tubular means connected to the other end of the pipe, pipe means in flow communication with the pipe at the first buoy to enable transportation of fluids between the vessel and the shore, a second buoy including a mast portion extending above the water surface, and a flexible rod secured at one of its ends to the mast portion and secured at the other of its ends adjacent the other end of the pipe.

11. A buoy according to claim 9 including means for indicating the position of the buoy such that the buoy can be located from a vessel when positioned in the body of water.

12. A buoy according to claim 9 including means for releasably securing the upper portion to the lower portion.

References Cited

UNITED STATES PATENTS

| 2,652,550 | 9/1953 | Lash | 114—235 X |
| 3,258,793 | 7/1966 | Schultz. | |
| 3,380,091 | 4/1968 | Sayrin et al. | |

TRYGVE M. BLIX, Primary Examiner

U.S. Cl. X.R.

114—230